US007268835B2

(12) United States Patent
Babonneau et al.

(10) Patent No.: US 7,268,835 B2
(45) Date of Patent: Sep. 11, 2007

(54) DEVICE AND METHOD FOR NOISE REDUCTION OF A VIDEO SIGNAL

(75) Inventors: Jean-Yves Babonneau, L'Hermitage (FR); Olivier Le Meur, Talensac (FR); Jacky Dieumegard, Rennes (FR)

(73) Assignee: Thomson Licensing, Boulogne-Billancourt (FR)

( * ) Notice: Subject to any disclaimer, the term of this patent is extended or adjusted under 35 U.S.C. 154(b) by 515 days.

(21) Appl. No.: 10/958,904

(22) Filed: Oct. 5, 2004

(65) Prior Publication Data
US 2005/0094035 A1 May 5, 2005

(30) Foreign Application Priority Data
Oct. 14, 2003 (FR) .................................. 03 12006

(51) Int. Cl.
*H04N 5/00* (2006.01)
(52) U.S. Cl. ..................... 348/607; 348/620; 348/621; 382/265
(58) Field of Classification Search ............... 348/607, 348/620, 621, 624, 616–617, 700–701; 382/265, 382/275, 260–261, 263–264; 708/300, 320; *H04N 5/00*
See application file for complete search history.

(56) References Cited

U.S. PATENT DOCUMENTS

| 4,296,436 | A | | 10/1981 | Achiha ....................... 358/167 |
|---|---|---|---|---|
| 5,343,247 | A | | 8/1994 | Vogel ......................... 348/402 |
| 5,442,407 | A | | 8/1995 | Iu ............................... 348/620 |
| 5,446,501 | A | | 8/1995 | Takemoto et al. |
| 5,574,512 | A | * | 11/1996 | Saeger ........................ 348/620 |
| 5,880,791 | A | * | 3/1999 | De Haan et al. ............ 348/607 |
| 5,903,680 | A | * | 5/1999 | De Haan et al. ............ 382/265 |
| 6,037,986 | A | | 3/2000 | Zhang et al. ................ 348/409 |
| 6,281,942 | B1 | | 8/2001 | Wang ........................ 348/607 |
| 6,847,408 | B1 | * | 1/2005 | Webb ......................... 348/607 |
| 7,145,607 | B1 | * | 12/2006 | Hui ............................. 348/607 |
| 2002/0101543 | A1 | | 8/2002 | Ojo et al. .................... 348/607 |
| 2004/0012720 | A1 | * | 1/2004 | Alvarez ...................... 348/607 |

* cited by examiner

*Primary Examiner*—Trang U. Tran
(74) *Attorney, Agent, or Firm*—Joseph J. Laks; Ronald H. Kurdyla; Guy H. Eriksen

(57) ABSTRACT

The disclosure relates to a device and to a method for noise reduction of a video signal. The device is comprised of the following components. A motion-compensated interpolation means, a recursive filter intended to receive the output of the recursive filter motion-compensated by the interpolation means at a first input, and the video signal at a second input;
means for calculating the difference between the video signal and the output of the recursive filter motion-compensated by the interpolation means;
wherein the device includes means for providing the first input of the recursive filter either with the video signal if the difference is greater than a predetermined noise level threshold, or the motion-compensated output of the recursive filter, if the difference is less than the said predetermined noise level threshold.

8 Claims, 2 Drawing Sheets

DEVICE AND METHOD FOR NOISE REDUCTION OF A VIDEO SIGNAL

This application claims the benefit, under 35 U.S.C. § 119 of French Patent Application 0312006, filed Oct. 14, 2003.

The present invention relates to a device and to a method for noise level reduction.

BACKGROUND OF THE INVENTION

Noise reduction is an essential part of video pre-processing prior to encoding. It is based on recursive time filtering.

The noise reduction techniques are generally carried out on digital video images in the form of a matrix of samples; each sample is composed of a luminance signal and, in the case of a colour signal, a chrominance signal.

Even today, the acquisition of video image sequences is still broadly carried out in an analogue form so that, once they have been acquired and optionally transmitted and stored in analogue formats, the images contain a substantial noise component. Once they have been digitized, these images are often also subjected to storage/editing operations which in turn introduce noise, this time of a digital nature. Lastly, a sequence of images undergoes a succession of transformations which lead to spatiotemporal noise of a highly random nature.

In order to obtain good results, the noise reduction methods which use recursive filtering address the very high temporal correlation of the images in a video sequence. The ideas of motion and displacement are therefore important with a view to developing effective noise reduction.

"Displacement" is intended to mean an object's change of position in a scene, this change of position being localized and specific to this object. "Motion" is intended to mean all the displacements of objects in a video sequence, taken together.

The motion is conventionally detected either by simple image-to-image differencing, or by using a motion estimator.

When a motion estimator is used, the displacements are accounted for by taking image differences at separate times, as well as by moving spatially through the frames. These displacements are represented by motion vector fields relating to pixels (motion estimation per pixel) or to blocks (motion estimation in blocs). This provides motion-compensated image differences, referred to as DFDs (Displacement Frame Differences), for pixels or for blocks.

A motion estimator has imperfections, however, which may lead to output defects of the recursive filter, and which are propagated through time by the principle of recursion. Examples of these imperfections are the problems of object tracking, one object being masked by another, and the appearance of a new object.

One solution envisaged in order to overcome these drawbacks is to apply the recursive filter only to fixed regions or regions with little motion. The noise reducer is then a motion-adapted noise reducer, instead of a motion-compensated noise reducer. A major drawback of such a method is that the noise is only removed from sequences without motion or with little motion, or from regions of images, but, if there is noise in a sequence, then the noise will be present throughout the sequence. Such a noise reducer would not therefore be very effective.

BRIEF SUMMARY OF THE INVENTION

The invention relates to a device and a method for noise reduction which evaluate the noise in the image and the errors due to the motion compensation.

To that end, the invention relates to a device for noise reduction of a video signal, comprising:
  motion-compensated interpolation means,
  a recursive filter intended to receive the output of the recursive filter motion-compensated by the interpolation means at a first input, and the video signal at a second input,
  means for calculating the difference between the video signal and the output of the recursive filter motion-compensated by the interpolation means.

According to the invention, the device has:
  means for providing the first input of the recursive filter either with the video signal, if the difference is greater than a predetermined noise level threshold, or the motion-compensated output of the recursive filter, if the difference is less than the said predetermined noise level threshold.

The invention thus makes it possible to separate the errors due to the motion compensation and the actual noise. The recursion loop is interrupted when the difference between the video signal and the motion-compensated output of the recursive filter is greater than a threshold, which makes it possible to avoid propagating the errors due to the motion compensation by breaking the recursion loop. It is therefore possible to carry out very severe filtering without producing artefacts at the output of the filter, which may occur owing to strong motion-compensation errors in the event of poor motion estimation.

According to a preferred embodiment, the device has:
  means for estimating the noise level of the video signal,
  means for calculating the said predetermined noise level threshold.

According to a preferred embodiment, the means for calculating the difference between the video signal and the output of the recursive filter motion-compensated by the interpolation means calculate the said difference for each pixel of the image carried by the video signal.

Advantageously, the recursive filter has one or two filtering cells.

According to a preferred embodiment, the said threshold is related to the filtering parameters of the said recursive filter.

This makes it possible to manually adjust the threshold, and may therefore allow a user to adjust the threshold according to the application.

According to a preferred embodiment, the said threshold depends on the noise level of each frame.

In this way, with the noise level capable of varying from one frame to another, the threshold can be modified and recalculated for each frame.

According to a preferred embodiment, the said threshold can be modified dynamically and locally by adapting it to characteristic regions of each image.

This makes it possible to adapt to frames which have an irregular noise level and therefore to locally limit the artefact risks within a given frame, while maintaining a high level of filtering.

The invention also relates to a method for noise reduction of a video signal, comprising the following steps:
motion-compensated interpolation,
recursive filtering intended to receive the motion-compensated output of the recursive filter at a first input and the video signal at a second input,
calculation of the difference between the video signal and the motion-compensated output of the recursive filter.

According to the invention, the method includes:
a step of providing the first input of the recursive filter either with the video signal, if the difference is greater than a predetermined noise level threshold, or the motion-compensated output of the recursive filter, if the difference is less than the said predetermined noise level threshold.

The invention also relates to a program product comprising program code instructions which are capable of carrying out the method according to the invention when the program is run on a computer.

BRIEF DESCRIPTION OF THE DRAWINGS

The invention will be understood more clearly and illustrated by means of preferred exemplary embodiments, which do not imply any limitation, with reference to the appended figures in which.

DETAILED DESCRIPTION OF THE INVENTION

Figure 1:
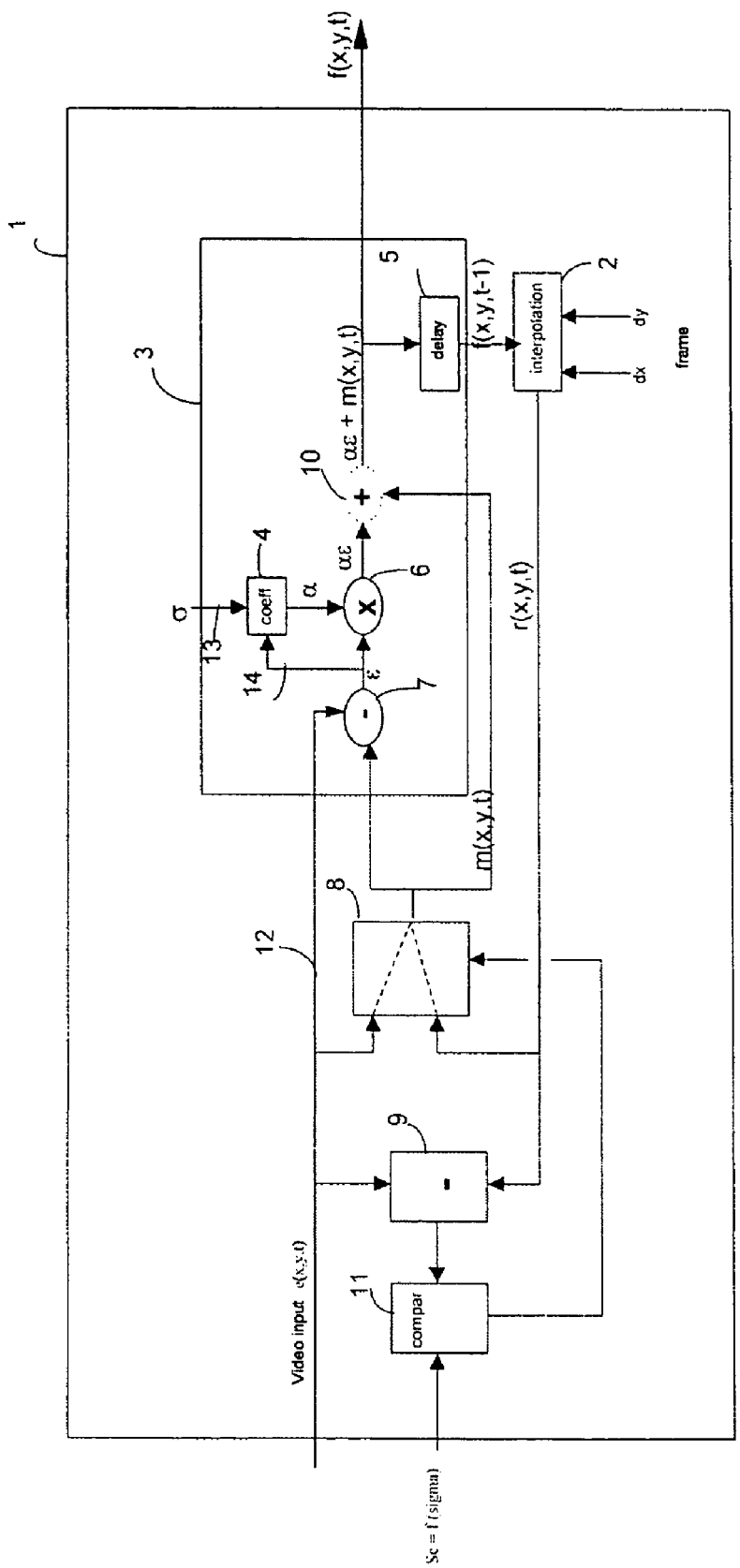
FIG. 1 represents a preferred embodiment of the invention, based on a recursive filter which has one filtering cell.

A noise reduction device 1 as represented in FIG. 1 can allow to correct the imperfections associated with the motion compensation in a motion-compensated recursive filtering device.

Such a device makes it possible to separate the errors due to the motion compensation and the actual noise.

The device 1 has a recursive filtering module 3 and a motion-compensated interpolation module 2.

The noise contained in some video sequences can reduce the effectiveness of a video encoder, for example of the MPEG type, leading to a poor visual quality of the decoded image even if there is a reasonable encoding rate.

The noise reduction device 1 is based on recursive filtering carried out by the recursive filter 3 and the motion-interpolation means 2.

The recursive filter 3 preferably has a granularity of the order of one pixel.

The video signal 12 represents an image made up of a certain number of pixels. Each image is encoded in an interleaved mode and is made up of two frames. Each pixel of the image is filtered by the device 3.

The video signal 12 is received at one input of the subtractor 7. The subtractor 7 receives the output m(x,y,t) of the multiplexer 8 at its second input.

The input of the recursive filter 3 receives an estimate sigma (($\sigma$) of the noise level 13, created for each frame by a noise level estimator (not shown in FIG. 1).

The noise level ($\sigma$) is used in order to calculate a recusive coefficient $\alpha$.

The recusive coefficient $\alpha$ weights the effectiveness of the filtering as a function of the noise level $\sigma$ in the frame and the calculated error 14 between the input video signal e(x,y,t) and the output m(x,y,t) of the multiplexer 8, that is to say the output of the differentiator 7.

$$\alpha = \frac{\varepsilon}{4 \times \sigma} \text{ and } \alpha \in [0.25; 1]$$

The coefficient $\alpha$ is sent to a multiplier 6, which receives the output $\epsilon$ of the differentiator 7 at its other input.

The following is therefore obtained at the output of the multiplier 6:

$$\alpha \times \epsilon = \alpha(e(x,y,t) - m(x,y,t))$$

The output of the multiplier 6 is connected to the input of an adder 10. The other input of the adder 10 is connected to the output of the multiplexer 8. f(x,y,t) is obtained at the output of the adder 10:

$$f(x,y,t) = \alpha \times e(x,y,t) + (1-\alpha) \times m(x,y,t)$$

The signal f(x,y,t) is then sent to the motion-compensated interpolation means 2, after having experienced a delay of one frame f(x,y,t−1). The interpolation means 2 generate the motion-compensated output r(x,y,t) from f(x,y,t−1) and the estimated displacement vector (dx,dy) between the current frame and the previous frame.

The motion-compensated output r(x,y,t) is then sent to a differentiator 9. The differentiator 9 also receives the video signal e(x,y,t) as input. The differentiator 9 produces the signal g(x,y,t) at its output.

$$g(x,y,t) = e(x,y,t) - r(x,y,t)$$

A comparator 11 receives g(x,y,t) and a noise level threshold Sc as input.

The threshold Sc depends on the final application with which the noise reduction device according to the invention may be associated. It represents a compromise between the effectiveness of the noise reducer and the appearance of artefacts at the output of the noise reducer. In a first embodiment, the threshold Sc may be linearly related to a degree of filtering severity.

If it is assumed a cursor is available for filtering adjustment with 5 positions (cursor_position), for example, then the following value may be assigned to Sc:

Sc=16+cursor_position, 16 being an arbitrarily fixed value.

Sc may be adapted to the noise level $\sigma$ in a second value embodiment, so that it can be varied for each frame.

According to a third embodiment, the threshold can be modified dynamically and locally by adapting it to characteristic regions of each image being processed. For instance, the risk of artefacts increases for the regions with motion, and it is preferable to lower the value of the threshold. The value of the threshold may be higher for regions with little movement.

The multiplexer 8 provides an input of the recursive filter with the video signal e(x,y,t) or the motion-compensated output r(x,y,t), depending on the result of the comparison performed by the comparator 11.

The multiplexer makes it possible to carry out sorting between the actual noise and the compensation errors.

The comparator 11 generates a control signal for the multiplexer 8.

If g(x,y,t)>Sc, then the control signal sent to the multiplexer 8 tells the multiplexer 8 to transmit the video signal e(x,y,t) to the recursive filter 3.

If g(x,y,t)<Sc, then the control signal sent to the multiplexer 8 tells the multiplexer 8 to transmit the motion-compensated output r(x,y,t) to the recursive filter 3.

Figure 2:
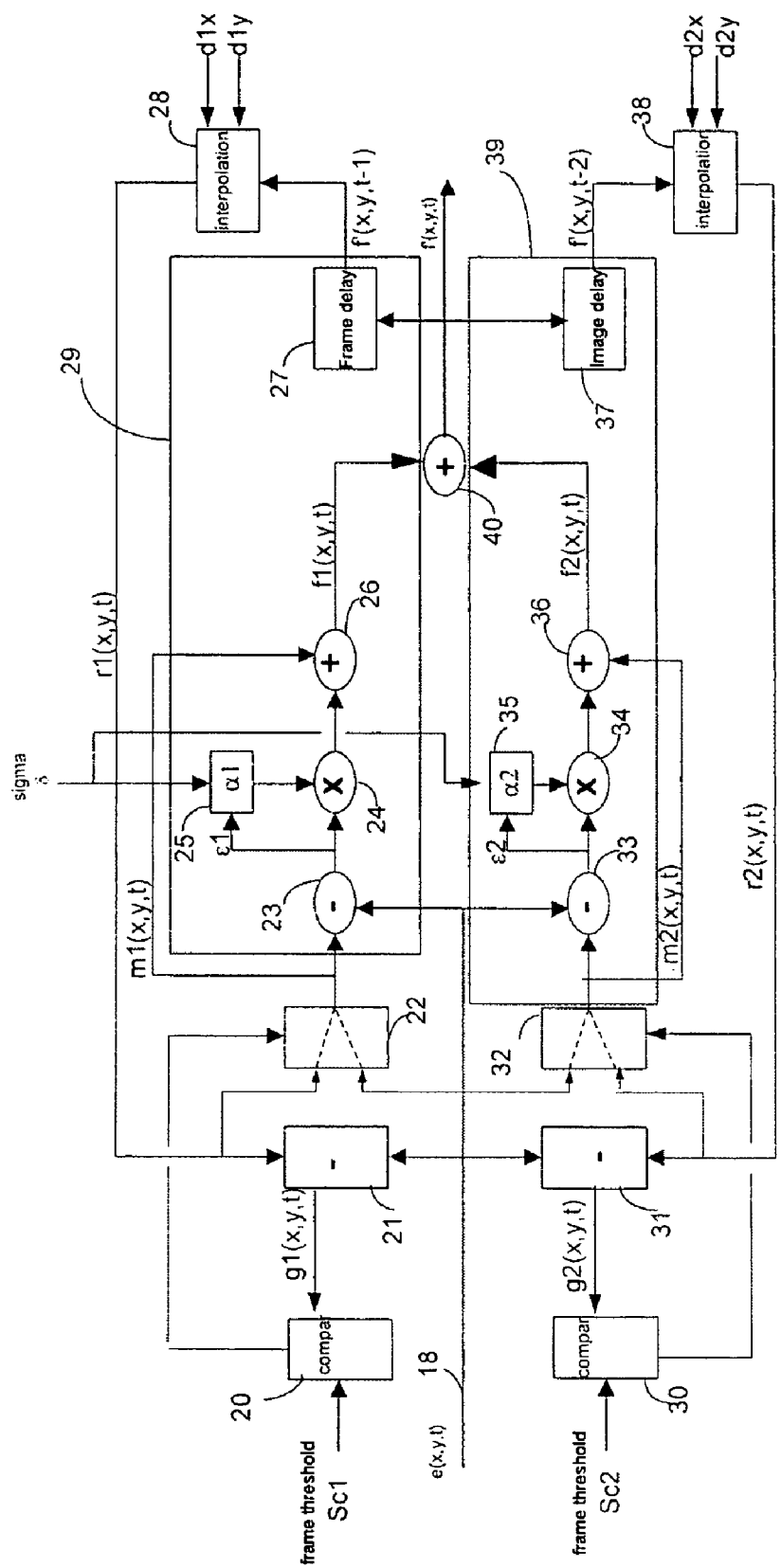
FIG. 2 represents a preferred embodiment of the invention, based on a recursive filter which has two filtering cells.

FIG. 2 represents another embodiment of the invention, applied to a recursive filter comprising two cells.

Like the device represented in FIG. 1, the device represented in FIG. 2 makes it possible to avoid the detrimental effects of the imperfections associated with the motion compensation in a motion-compensated recursive filtering device.

A recursive filter having two recursive filtering cells is more effective than a recursive filter including a single cell.

The noise reduction device as represented in FIG. 2 has two recursive filters 29 and 39, respectively coupled to two motion-interpolation modules 28 and 38.

The recursive filters 29 and 39 preferably have a granularity of the order of one pixel.

The video signal 18 represents an image made up of a certain number of pixels. In the preferred embodiment, each image is encoded in an interleaved mode and is made up of two frames, although it could also be encoded in a progressive mode. Each pixel of the incoming image is filtered by the recursive filter 29 and by the recursive filter 39. The video signal is received at one input of a subtractor 23 and at one input of a subtractor 33. The subtractor 23 receives the output of a multiplexer 22 at its second input, and the subtractor 33 receives the output of a multiplexer 32 at its second input.

The inputs of the recursive filters 29 and 39 receive an estimate delta ($\delta$) of the noise level, created for each frame by a noise level estimator (not shown in FIG. 2). The noise level $\delta$ is used in order to calculate a recusive coefficient $\alpha 1$ of the recursion filter 29 and a recusive coefficient $\alpha 2$ of the recursive filter 39.

The recusive coefficients $\alpha 1$ and $\alpha 2$ weight the effectiveness of the filtering as a function of the noise level $\delta$ in the frame and, respectively, the calculated error $\epsilon 1$ or $\epsilon 2$ between the input video signal e(x,y,t) and the output m1(x,y,t) of the multiplexer 22 or the output m2(x,y,t) of the multiplexer 32, that is to say respectively the output of the differentiators 23 or 33.

$$\alpha 1 = \frac{\varepsilon 1}{4 \times \delta} \text{ and } \alpha 1 \in [0.25; 1]$$

The coefficient $\alpha 1$ is sent to a multiplier 24, which receives the output $\epsilon 1$ of the differentior 23 at its other input.

The following is therefore obtained at the output of the multiplier 24:

$$\alpha 1 \times \epsilon 1 = \alpha 1 (e(x,y,t) - m1(x,y,t))$$

The output of the multiplier 24 is connected to the input of an adder 26. The other input of the adder 26 is connected to the output of the multiplexer 22. f1(x,y,t) is obtained at the output of the adder 26.

$$f1(x,y,t) = \alpha 1 \times e(x,y,t) + (1-\alpha 1) \times m1(x,y,t)$$

$$\alpha 2 = \frac{\varepsilon 2}{4 \times \delta} \text{ and } \alpha 2 \in [0.25; 1]$$

The coefficient $\alpha 2$ is sent to a multiplier 34, which receives the output $\epsilon 2$ of the differentior 33 at its other input.

The following is therefore obtained at the output of the multiplier 34:

$$\alpha 2 \times \epsilon 2 = \alpha 2 (e(x,y,t) - m2(x,y,t))$$

The output of the multiplier 34 is connected to the input of an adder 36. The other input of the adder 36 is connected to the output of the multiplexer 32. f2(x,y,t) is obtained at the output of the adder 36.

$$f2(x,y,t) = \alpha 2 \times e(x,y,t) + (1-\alpha 2) \times m2(x,y,t)$$

f1(x,y,t) and f2(x,y,t) are then sent to an adder 39, which provides the filtered signal f'(x,y,t) at its output.

$$f'(x,y,t) = [f1(x,y,t) + f2(x,y,t)]/2$$

The signal f'(x,y,t) is then sent to a frame delay module 27 and to an image delay module 37.

The signal f'(x,y,t-1) is thus obtained at the output of the frame delay module 27, and f'(x,y,t-2) is obtained at the output of the image delay module 37.

The interpolation means 27 generate the motion-compensated output r1(x,y,t) of the current frame from estimated motion vectors between the current frame and the previous frame, and from f'(x,y,t-1).

The interpolation means 37 generate the motion-compensated output r2(x,y,t) of the current frame from estimated motion vectors between the current frame and the previous frame, and from f'(x,y,t-2).

The motion-compensated output r1(x,y,t) is sent to a differentiator 21. The differentiator 21 also receives the video signal e(x,y,t) as input. The differentiator 21 produces the signal g1(x,y,t) at its output.

$$g1(x,y,t) = e(x,y,t) - r1(x,y,t)$$

The comparator 20 receives g1(x,y,t) and a noise level threshold Sc1 as input.

A multiplexer 22 provides an input of the recursive filter with the video signal e(x,y,t) or the motion-compensated output r1(x,y,t), depending on the result of the comparison performed by the comparator 20.

The multiplexer 22 makes it possible to carry out sorting between the actual noise and the compensation errors A comparator 20 generates a control signal for the multiplexer 8.

If g1(x,y,t)>Sc, then the control signal sent to the multiplexer 22 tells the multiplexer 22 to transmit the video signal e(x,y,t) to the recursive filter 29.

If g1(x,y,t)<Sc, then the control signal sent to the multiplexer 22 tells the multiplexer 22 to transmit the motion-compensated output r1(x,y,t) to the recursive filter 29.

The motion-compensated output r2(x,y,t) is sent to a differentiator 31. The differentiator 31 also receives the video signal e(x,y,t) as input. The differentiator 31 produces the signal g2(x,y,t) at its output.

$$g2(x,y,t) = e(x,y,t) - r2(x,y,t)$$

A comparator 30 receives g2(x,y,t) and a noise level threshold Sc2 as input.

The two noise level thresholds Sc1 and Sc2 may be independent.

A multiplexer 32 provides an input of the recursive filter with the video signal e(x,y,t) or the motion-compensated output r2(x,y,t), depending on the result of the comparison performed by the comparator 30.

The multiplexer 32 makes it possible to carry out sorting between the actual noise and the compensation errors.

The comparator 30 generates a control signal for the multiplexer 32.

If g2(x,y,t)>Sc2, then the control signal sent to the multiplexer 32 tells the multiplexer 32 to transmit the video signal e(x,y,t) to the recursive filter 39.

If g2(x,y,t)<Sc2, then the control signal sent to the multiplexer 32 tells the multiplexer 32 to transmit the motion-compensated output r2(x,y,t) to the recursive filter 39.

The thresholds Sc1 and Sc2 may be fixed, variable or dependent on the filtering severity, as indicated above for the threshold Sc.

The invention claimed is:

1. Device for noise reduction of a video signal, comprising
    motion-compensated interpolation means,
    a recursive filter intended to receive the output of the recursive filter motion-compensated by the interpolation means at a first input, and the video signal at a second input,
    means for calculating the difference between the video signal and the output of the recursive filter motion-compensated by the interpolation means, wherein it has
    means for providing the first input of the recursive filter either with the video signal, if the difference is greater than a predetermined noise level threshold, or the output of the recursive filter motion-compensated by the interpolation means, if the difference is less than the predetermined noise level threshold.

2. Device according to claim 1, wherein it has:
    means for estimating the noise level of the video signal,
    means for calculating the predetermined noise level threshold.

3. Device according to claim 2, wherein the means for calculating the difference between the video signal and the output of the recursive filter motion-compensated by the interpolation means calculate the difference for each pixel of the image carried by the video signal.

4. Device according to claim 1, wherein the recursive filter has one or two filtering cells.

5. Device according to claim 1, wherein the threshold is related to the filtering parameters of the recursive filter.

6. Device according to claim 1, wherein the threshold depends on the noise level of each frame.

7. Device according to claim 1, wherein the threshold can be modified dynamically and locally by adapting it to characteristic regions of each image.

8. Method for noise reduction of a video signal, comprising the following steps:
    motion-compensated interpolation,
    recursive filtering intended to receive the motion-compensated output of the recursive filter at a first input and the video signal at a second input,
    calculation of the difference between the video signal and the motion-compensated output of the recursive filter, wherein it includes
    a step of providing the first input of the recursive filter either with the video signal, if the difference is greater than a predetermined noise level threshold, or the motion-compensated output of the recursive filter, if the difference is less than the predetermined noise level threshold.

* * * * *